(No Model.)
J. ROWLEY.
CRICKET STUMP.
No. 578,835. Patented Mar. 16, 1897.
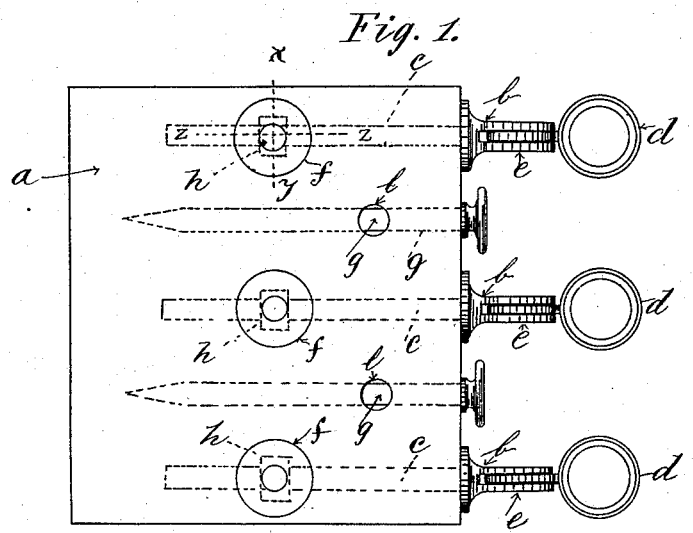
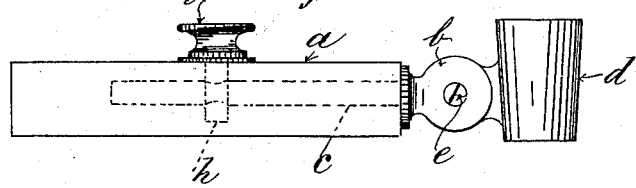
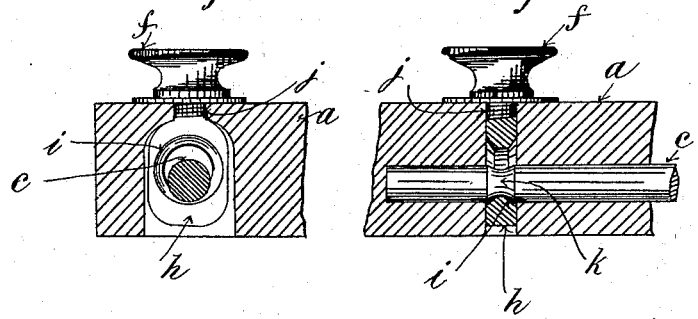
Witnesses.
Horace Grellier.
James Fleming.
Inventor.
Joseph Rowley.
per E. Eaton.
Atty.

UNITED STATES PATENT OFFICE.

JOSEPH ROWLEY, OF DUKINFIELD, ENGLAND.

CRICKET-STUMP.

SPECIFICATION forming part of Letters Patent No. 578,835, dated March 16, 1897.

Application filed October 15, 1896. Serial No. 608,959. (No model.)

*To all whom it may concern:*

Be it known that I, JOSEPH ROWLEY, a subject of the Queen of Great Britain, and a resident of Dukinfield, in the county of Chester, England, have invented certain new and useful Improvements in Cricket-Stumps, of which the following is a full, clear, and exact specification thereof.

This invention relates to improvements in or relating to cricket-stumps; and the object is to provide a support for the stumps which can be readily fixed in position, and the same is carried out as follows:

In order that my invention may be fully understood, I will now refer to the annexed drawings, in which—

Figure 1 is a plan view of my invention; Fig. 2, a side elevation of same; Fig. 3, a cross-section through line $x\,y$ in Fig. 1 on an enlarged scale; Fig. 4, a section through line $z\,z$ in Fig. 1 on an enlarged scale.

$a$ is a base of suitable material which can be secured to the ground by means of the spikes $g$ or the like, which are driven through the holes $l$ in the base $a$ into the ground or surface.

$d$ is a socket or holder in which the end of the cricket-stump is carried or held, this socket-piece being hinged or pivoted at $e$ to the forked piece $b$, which is attached to the pin or spindle $c$, which enters an aperture in the base $a$ and may be secured in the desired position by the locking device shown in Figs. 3 and 4.

$h$ is a plate having an aperture therein which has beveled edges $i$ and which encircles the pin or spindle $c$ at the grooved or hollowed part $k$.

By this arrangement it will be seen that the stumps may be set at the desired angle as the thumb-screw $f$ engages upon the screwed prolongation $j$ of the piece $h$, thus enabling the pin or spindle $c$ to be gripped and secured by the plate $h$. When not in use, the pins or the like $g$ may be carried in apertures in the base $a$.

By this invention it will be seen that the stumps instead of being fixed in the earth are carried in the sockets $d$ and are free to move when struck by the ball, the balls being carried upon the top of the stumps, as usual, and by this means it will be seen that a true wicket is insured.

Although I have shown three sockets upon a base, I do not confine myself to this number nor to the exact details of construction.

Having thus described my invention, what I claim, and desire to secure by Letters Patent, is—

In holders or supports for cricket-stumps, in combination a base-piece, pivoted sockets or stump-holders carried upon pins or spindles which engage in apertures in said base-piece; plates or rings encircling said pins or spindles and bearing in grooves thereon and having a screwed prolongation thereon upon which a thumb-screw engages for the purpose of locking the pins or spindles in position.

In testimony that I claim the foregoing I have hereunto set my hand this 18th day of August, 1896.

JOSEPH ROWLEY.

Witnesses:
P. R. GOLDRING,
JAMES FLEMING.